(12) United States Patent
Masaoka

(10) Patent No.: US 8,885,332 B2
(45) Date of Patent: Nov. 11, 2014

(54) ELECTRONIC DEVICE

(71) Applicant: Panasonic Corporation, Kadoma (JP)

(72) Inventor: Satoru Masaoka, Osaka (JP)

(73) Assignee: Panasonic Corporation, Osaka (JP)

( * ) Notice: Subject to any disclaimer, the term of this patent is extended or adjusted under 35 U.S.C. 154(b) by 106 days.

(21) Appl. No.: 13/783,846

(22) Filed: Mar. 4, 2013

(65) Prior Publication Data

US 2014/0071608 A1 Mar. 13, 2014

(30) Foreign Application Priority Data

Sep. 7, 2012 (JP) .................................. 2012-197456

(51) Int. Cl.
*H05K 5/00* (2006.01)
*H05K 7/00* (2006.01)
*G06F 1/16* (2006.01)
*H04M 1/00* (2006.01)

(52) U.S. Cl.
CPC .................................... *G06F 1/1656* (2013.01)
USPC ............ 361/679.27; 361/679.26; 361/679.28; 361/679.55; 455/575.1; 455/575.3

(58) Field of Classification Search
USPC ............. 361/679.26, 679.27, 679.28, 679.29, 361/679.3, 679.55, 679.56; 455/575.1, 455/575.3, 575.4
See application file for complete search history.

(56) References Cited

U.S. PATENT DOCUMENTS

| 6,044,473 | A  | * | 3/2000 | Kim .............................. 713/320 |
| 7,103,698 | B2 | * | 9/2006 | Zhang et al. .................. 710/303 |
| 8,243,438 | B2 | * | 8/2012 | Wang et al. ............. 361/679.55 |
| 8,633,947 | B2 | * | 1/2014 | Kitahara ....................... 345/632 |
| 2005/0083644 | A1 | * | 4/2005 | Song ............................. 361/683 |
| 2009/0079723 | A1 | * | 3/2009 | Wang et al. ................... 345/212 |

FOREIGN PATENT DOCUMENTS

JP 2001-242953 9/2001

* cited by examiner

*Primary Examiner* — Anthony Haughton
(74) *Attorney, Agent, or Firm* — Hamre, Schumann, Mueller & Larson, P.C.

(57) ABSTRACT

An electronic device includes an input device, a display that displays information, a first housing provided with the input device, a second housing provided with the display, a coupler that couples the first housing and the second housing to each other to enable changing of a positional relationship between the first housing and the second housing, a setter that allows a user to make a setting for enabling or disabling inputting to the input device, a positional-relationship detector that detects the positional relationship between the first housing and the second housing, and a controller that enables inputting to the input device, regardless of a setting by the setter, when a result of detection by the positional-relationship detector satisfies a first predetermined condition, in a case where a setting by the setter is made to disable inputting to the input device.

8 Claims, 7 Drawing Sheets

ELECTRONIC DEVICE

BACKGROUND

1. Technical Field

The present disclosure relates to an electronic device including an input device, a display for displaying information, a first housing provided with the input device, a second housing provided with the display, and a coupler that couples the first housing and the second housing to each other to enable changing of the positional relationship therebetween.

2. Related Art

JP 2001-242953 A discloses a notebook type computer including an input device, a display for displaying information, a first housing provided with the input device, a second housing provided with the display, and a coupler that couples the first housing and the second housing to each other to enable changing of the positional relationship therebetween. The computer can be in a PC state and a tablet state by changing the positional relationship between the first housing and the second housing. When the computer is used in the tablet state, the computer can disable inputs to the input device by a manipulation switch. This can prevent erroneous inputs.

SUMMARY

In a case where inputting to the input device is disabled by the manipulation switch when the computer is in the tablet state, it is necessary to enable inputting to the input device by the manipulation switch when the computer is returned to the PC state, which degrades the usability for users.

The present disclosure provides an electronic device including an input device, a display for displaying information, a first housing provided with the input device, a second housing provided with the display, and a coupler for coupling the first housing and the second housing to each other such that the positional relationship therebetween can be changed, wherein the electronic device has improved usability for users.

An electronic device according to the present disclosure includes:

- an input device;
- a display that displays information;
- a first housing provided with the input device;
- a second housing provided with the display;
- a coupler that couples the first housing and the second housing to each other to enable changing of a positional relationship between the first housing and the second housing;
- a setter that allows a user to make a setting for enabling or disabling inputting to the input device;
- a positional-relationship detector that detects the positional relationship between the first housing and the second housing; and
- a controller that enables inputting to the input device, regardless of a setting by the setter, when a result of detection by the positional-relationship detector satisfies a first predetermined condition, in a case where a setting by the setter is made to disable inputting to the input device.

According to the present disclosure, even when a setting by the setter is made to disable inputs to the input device, if the positional relationship between the first housing and the second housing satisfies the first predetermined condition, it is possible to enable inputs to the input device, regardless of the content of setting by the setter. Accordingly, it is possible to enable inputs to the input device, without causing the user to manipulate the setter again. This can improve the user's usability of the electronic device which includes the input device, the display for displaying information, the first housing provided with the input device, the second housing provided with the display, and the coupler for coupling the first housing and the second housing to each other such that the positional relationship therebetween can be changed.

DETAILED DESCRIPTION OF PREFERRED EMBODIMENTS

Hereinafter, embodiments will be described in detail with reference to the drawings, as necessary. However, descriptions in detail more than necessary may be omitted. For example, matters which have already been well-known may not be described in detail, and substantially the same configurations may not be described redundantly. This is for avoiding the following descriptions from being unnecessarily redundant for allowing those skilled in the art to easily understand them.

Further, the present inventor(s) gives the accompanying drawings and the following descriptions for allowing those skilled in the art to sufficiently understand the present disclosure, and the main theme defined in the claims is not intended to be restricted thereby.

First Embodiment

Hereinafter, a first embodiment will be described with reference to the drawings.

1-1. System Configuration

Figure 1:
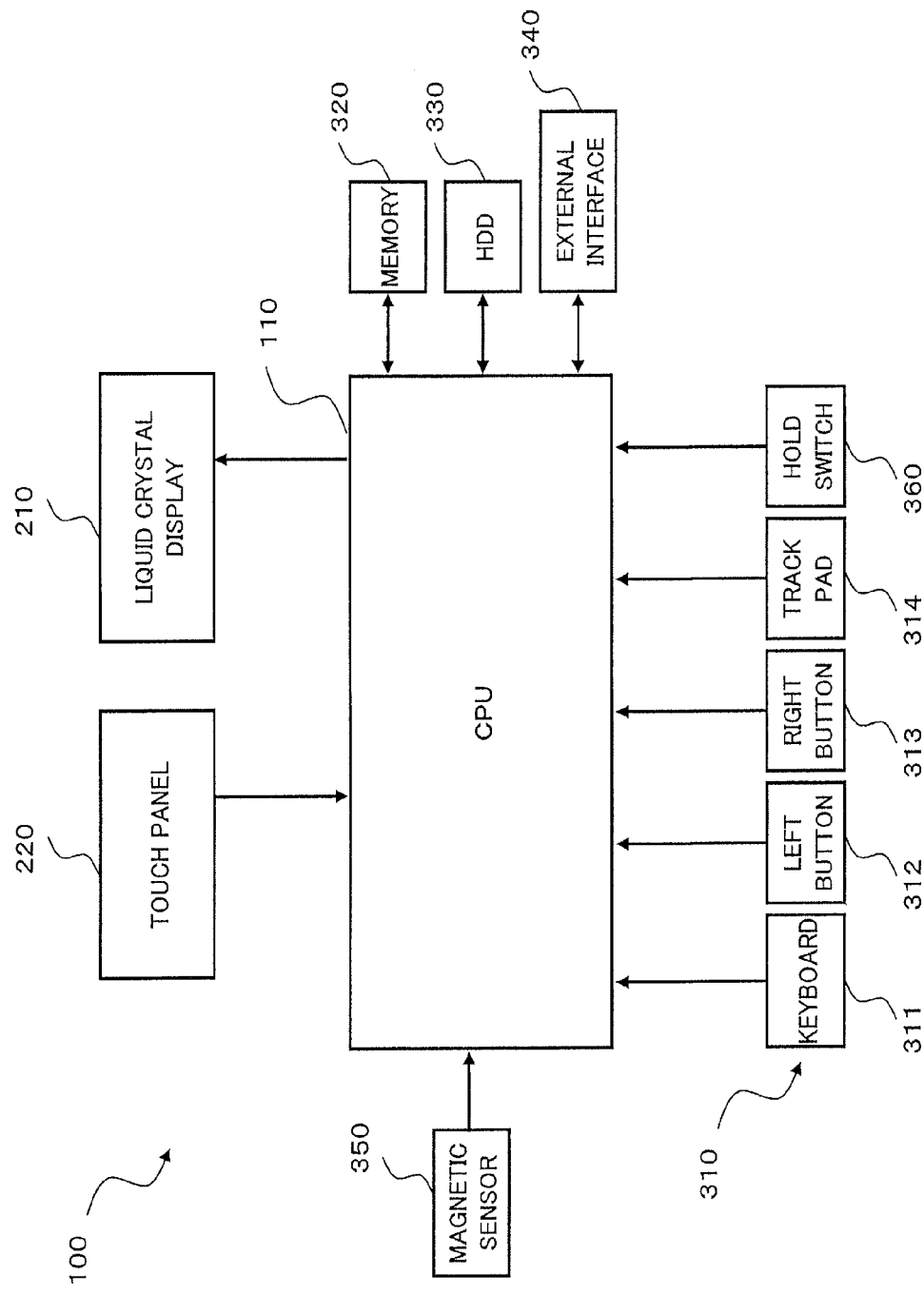
FIG. 1 is a block diagram illustrating a system configuration of a computer according to a first embodiment.

FIG. 1 is a block diagram illustrating a system configuration of a computer according to the first embodiment. A computer 100 includes a CPU 110, a liquid crystal display 210, a touch panel 220, an input device 310, a memory 320, a hard disk 330, an external interface 340, a magnetic sensor 350, and a hold switch 360.

The CPU 110 performs arithmetic processes.

The hard disk 330 stores programs and data to be subjected to arithmetic processes by the CPU 110. Instead of the hard disk 330, it is also possible to employ a solid state disc (SSD) which utilizes a flash memory or the like.

The memory 320 temporarily stores programs and data when arithmetic processes are performed by the CPU 110.

The external interface 340 is an interface for inputting and outputting signals from and to external devices. The external interface 340 includes, for example, an USB interface and a LAN interface.

The magnetic sensor 350 detects the direction of magnetic fluxes.

The liquid crystal display 210 displays, thereon, a video image based on video image data which is outputted from the CPU 110.

The touch panel 220 is a planar-shaped pointing device. The touch panel 220 is provided to be overlaid on the display surface of the liquid crystal display 210 and outputs signals relating to positions touched by a user.

The input device 310 includes a keyboard 311, a left button 312, a right button 313, and a track pad 314.

The keyboard 311 is an interface which allows the user to input textual information and the like to the computer 100. The keyboard 311 includes a plurality of keys and outputs signals corresponding to keys which have been manipulated.

The left button 312 and the right button 313 are push-button type switches, for example. The left button 312 and the right button 313 are switches for selecting functions and executing functions, for example.

The track pad 314, which is a planar-shaped pointing device, outputs signals relating to positions touched by the user.

The hold switch 360 is a push-button type switch, for example. The hold switch 360 is arranged in a surface in which the input device 310 is arranged. The hold switch 360 is arranged between the left button 312 and the right button 313.

1-2. Configurations

Figure 2:
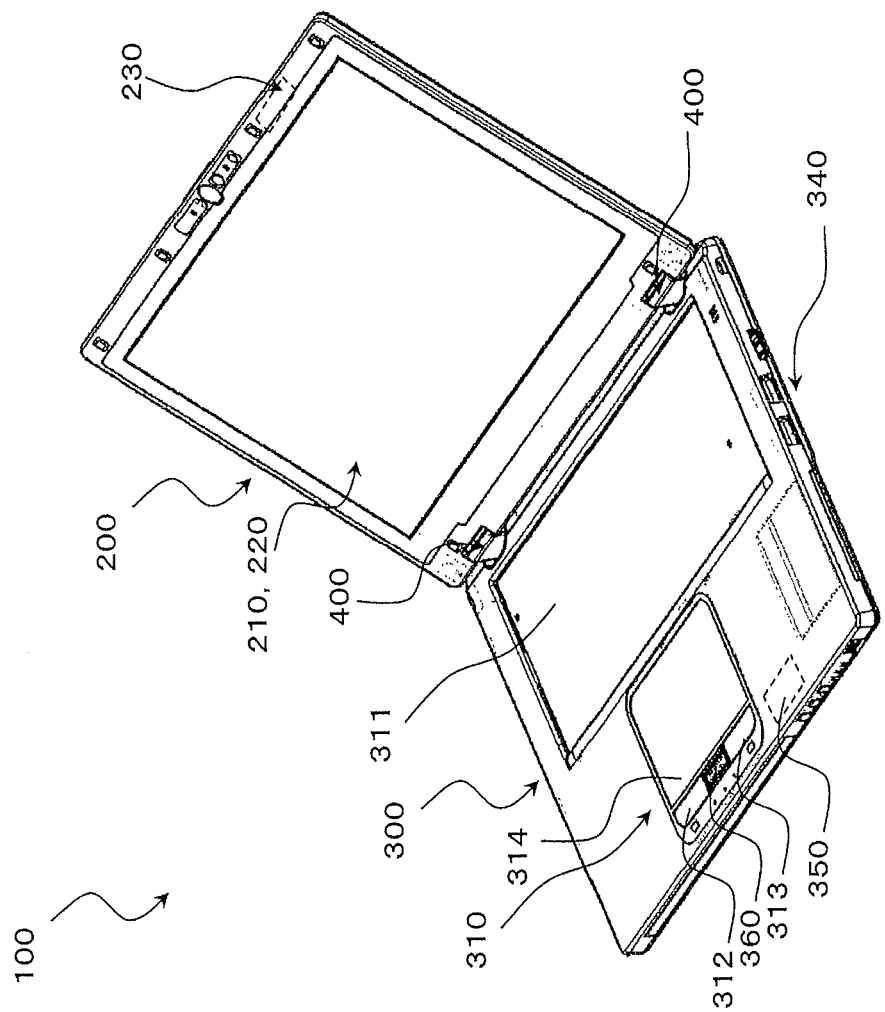
FIG. 2 is a perspective view of the computer according to the first embodiment (in a PC state).

FIG. 2 is a perspective view of the computer according to the first embodiment (in a PC state (which will be described later)). The computer 100 includes a first housing 300 and a second housing 200.

The first housing 300 is provided with the liquid crystal display 210 and the touch panel 220. Further, a magnet 230 is housed in the first housing 300.

The second housing 200 is provided with the input device 310, the hold switch 360 and the external interface 340. Further, the second housing 200 includes therein the CPU 110, the memory 320, the hard disk 330, and the magnetic sensor 350. Although the keyboard 311 includes a plurality of keys, they are not illustrated in FIG. 2. This also applies to FIGS. 3, 4, and 5 which will be described later.

The first housing 300 and the second housing 200 are coupled to each other by a hinge 400. The hinge 400 supports the first housing 300 and the second housing 200 such that the first housing 300 and the second housing 200 can rotate with respect to each other by 360 degrees.

Figure 3:
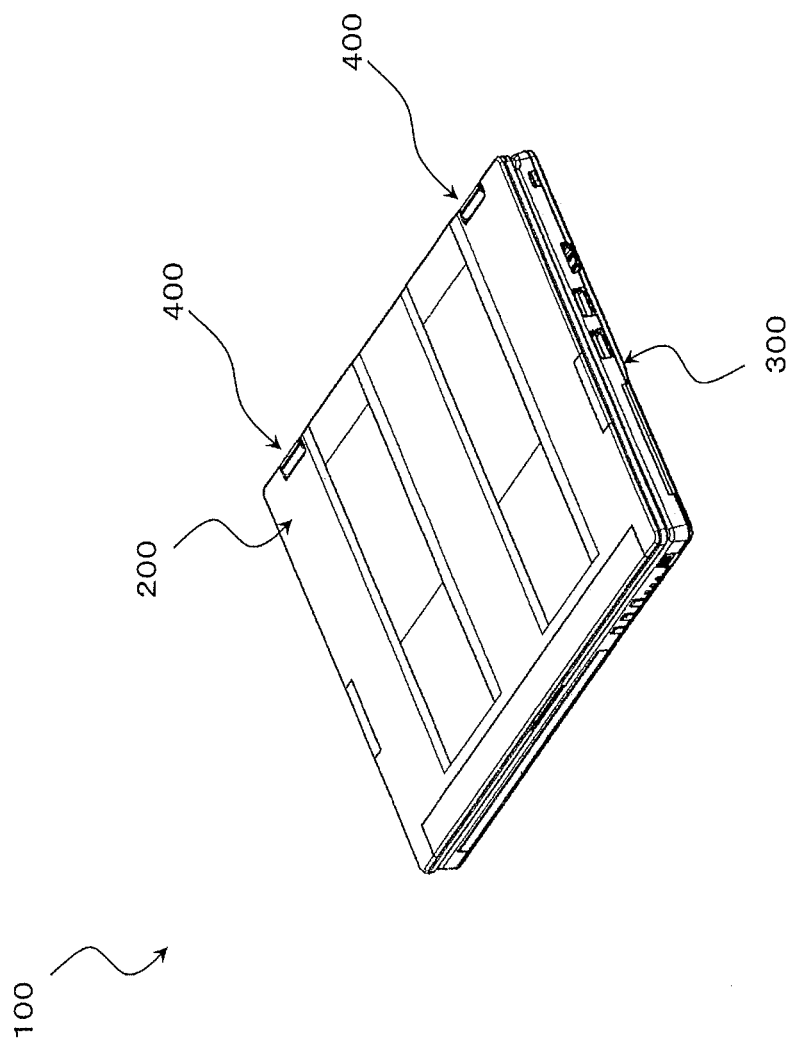
FIG. 3 is a perspective view of the computer according to the first embodiment (in a folded state).
Figure 4:
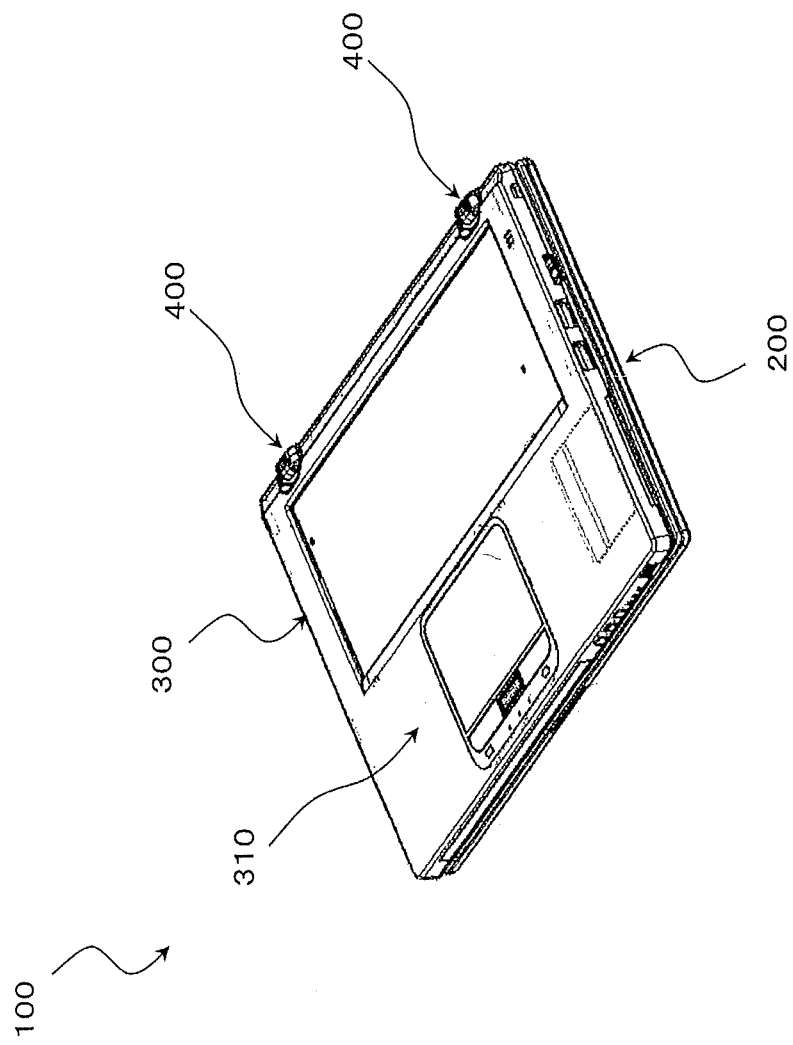
FIG. 4 is a perspective view of the computer according to the first embodiment (a view illustrating a keyboard-side surface in a tablet state).
Figure 5:
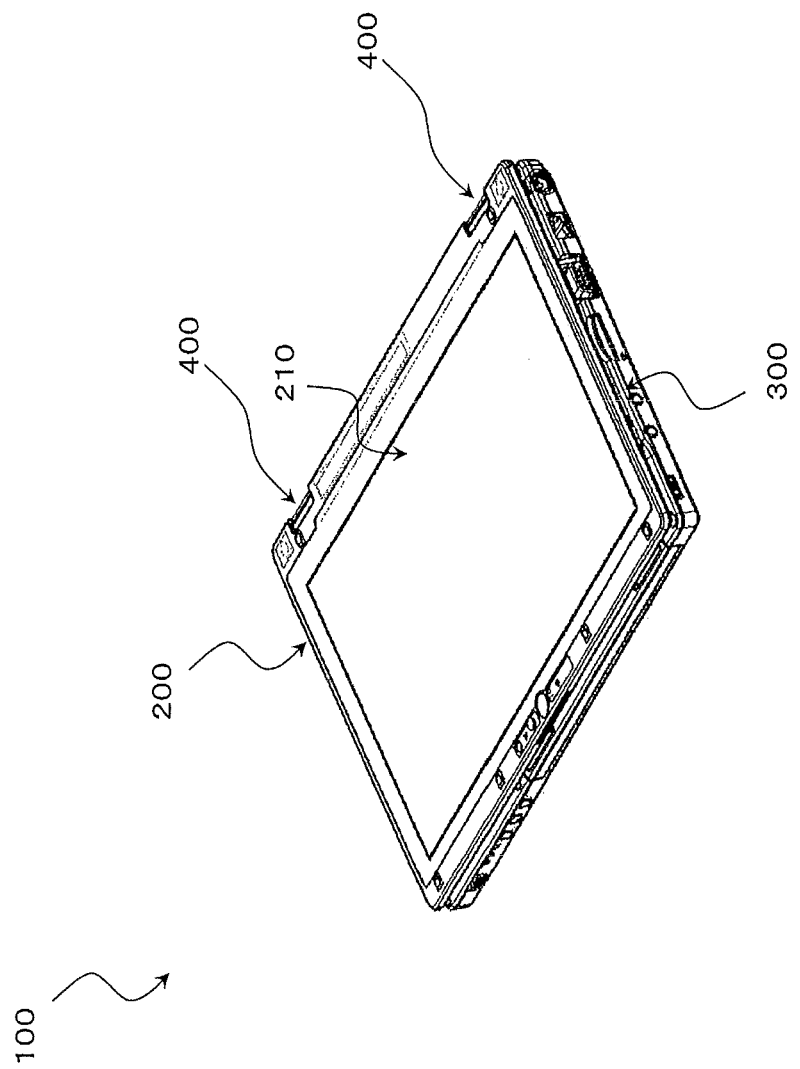
FIG. 5 is a perspective view of the computer according to the first embodiment (a view illustrating a liquid crystal display-side surface in the tablet state).

FIG. 3 is a perspective view of the computer according to the first embodiment (in a folded state (which will be described later)). FIG. 4 is a perspective view of the computer according to the first embodiment (a view illustrating a keyboard-side surface in a tablet state (which will be described later)). FIG. 5 is a perspective view of the computer according to the first embodiment (a view illustrating a display-side surface in the tablet state).

Since the hinge 400 is configured to allow the first housing 300 and the second housing 200 to rotate with respect to each other by 360 degrees, the computer 100 is enabled to be in the folded state illustrated in FIG. 3 and in the tablet state illustrated in FIGS. 4 and 5. Further, the folded state refers to a state in which the input device 310 is oriented toward the second housing 200 and the liquid crystal display 210 is oriented toward the first housing 300, while the first housing 300 and the second housing 200 are overlaid on each other. The tablet state refers to a state in which the input device 310 is oriented in the direction opposite to the second housing 200 and the liquid crystal display 210 is oriented in the direction opposite to the first housing 300, while the first housing 300 and the second housing 200 are overlaid on each other. The PC state refers to a state in which, as illustrated in FIG. 2, the surface having the input device 310 in the first housing 300 and the surface having the liquid crystal display 210 in the second housing 200 form an angle of about 120 degrees, for example.

As described above, the computer 100 according to the present embodiment can be used as a notebook-type (laptop type) computer which enables inputting through the input device such as the keyboard, in the PC state. Further, when the computer 100 is in the tablet state, it can be used as a tablet which enables inputting through the touch panel. Further, the computer 100 may also enable inputting through the touch panel as well as through the keyboard, in the PC state.

1-3. Operation

Operation of the computer 100 will be described with reference to FIG. 1. The CPU 110 reads programs and data of various types which have been stored in the hard disk 330 and, performs arithmetic processes based on these programs and data, and also based on signals from the touch panel 220, the input device 310, the external interface 340, the magnetic sensor 350, and the like.

In the case where the first housing 300 and the second housing 200 which constitute the computer 100 are configured such that they can be rotated with respect to each other by 360 degrees about the hinge 400 as in the present embodiment, the user may touch the keyboard 311 or the track pad 314 when rotating the first housing 300 and the second housing 200 with respect to each other. This may cause functions, which are not desired by the user, to be activated in the computer 100. To cope therewith, the hold switch 360 described above is provided in the present embodiment.

Further, the CPU 110 alternately turns on and turns off (releases) the hold setting every time the hold switch 360 is pushed. When the hold setting is ON, even if signals are outputted from the touch panel 220 or from the keyboard 311 and the track pad 314 in the input device 310 or if the left button 312 and the right button 313 are pushed, the CPU 110 does not perform processes corresponding thereto. That is, the CPU 110 disables inputs to the keyboard 311, the left button 312, the right button 313, and the track pad 314 in the input device 310.

That is, the CPU 110 determines whether the computer 100 is currently in the PC state or the tablet state, or has just been changed from the tablet state to the PC state, based on signals from the magnetic sensor 350. Further, according to the result of the determination, the CPU 110 enables or disables inputs to the keyboard 311, the left button 312, the right button 313, and the track pad 314 in the input device 310.

More specifically, if it is determined that the computer 100 is in the PC state based on signals from the magnetic sensor 350, the CPU 110 further determines whether or not the hold setting is ON. If it is determined that the hold setting is ON, the CPU 110 disables inputs to the keyboard 311, the left button 312, the right button 313 and the track pad 314 in the input device 310. On the contrary, if it is determined that the hold setting is not ON, the CPU 110 enables inputs to the keyboard 311, the left button 312, the right button 313, and the track pad 314 in the input device 310.

On the other hand, if it is determined that the computer 100 is in the tablet state, the CPU 110 disables inputs to the keyboard 311, the left button 312, the right button 313, and the track pad 314 in the input device 310, regardless of whether or not the hold setting is ON. Accordingly, even when the user has not turned on the hold setting or when the user has forgotten to turn on the hold setting, it is possible to disable inputs to the keyboard 311, the left button 312, the right button 313, and the track pad 314 in the input device 310. In the tablet state, the input device 310 is oriented downwardly when the computer 100 is used. Therefore, it is necessary to disable inputs to the input device 310, in consideration of cases where the computer 100 is placed on a table or the like. In the present embodiment, it is possible to forcibly perform the invalidation. Further, when the hold setting is turned on by the hold switch 360, it is possible to disable inputs to the input device by both the hold switch 360 and the magnetic sensor 350 doubly.

Further, if it is determined that the computer 100 has just been changed from the tablet state to the PC state, the CPU 110 enables inputs to the keyboard 311, the left button 312, the right button 313, and the track pad 314 in the input device 310, regardless of whether or not the hold setting is ON. The CPU 110 performs the validation after the elapse of a predetermined time period after it is determined that the computer has just been changed from the tablet state to the PC state. The predetermined time period may be set to be a time period which is generally required for transformation of the computer 100 from the tablet state to the PC state, for example. The predetermined time period is 2 seconds, for example. If the validation is performed before the elapse of the predetermined time period, the validation may be performed halfway through the transformation, which may cause undesired functions to be activated. On the contrary, if the validation is performed after the elapse of a time period longer than the predetermined time period, the user is required to wait for the validation, thereby degrading the usability. By setting the predetermined time period as described above, it is possible to enable inputting through the input device 310 immediately after the transformation, while preventing activation of undesired functions.

With the computer 100 according to the present embodiment, when the computer 100 has been changed from the tablet state to the PC state, the CPU 110 automatically releases the invalidation of inputs to the keyboard 311, the left button 312, the right button 313, and the track pad 314 in the input device 310, and then enables them.

Figure 6:
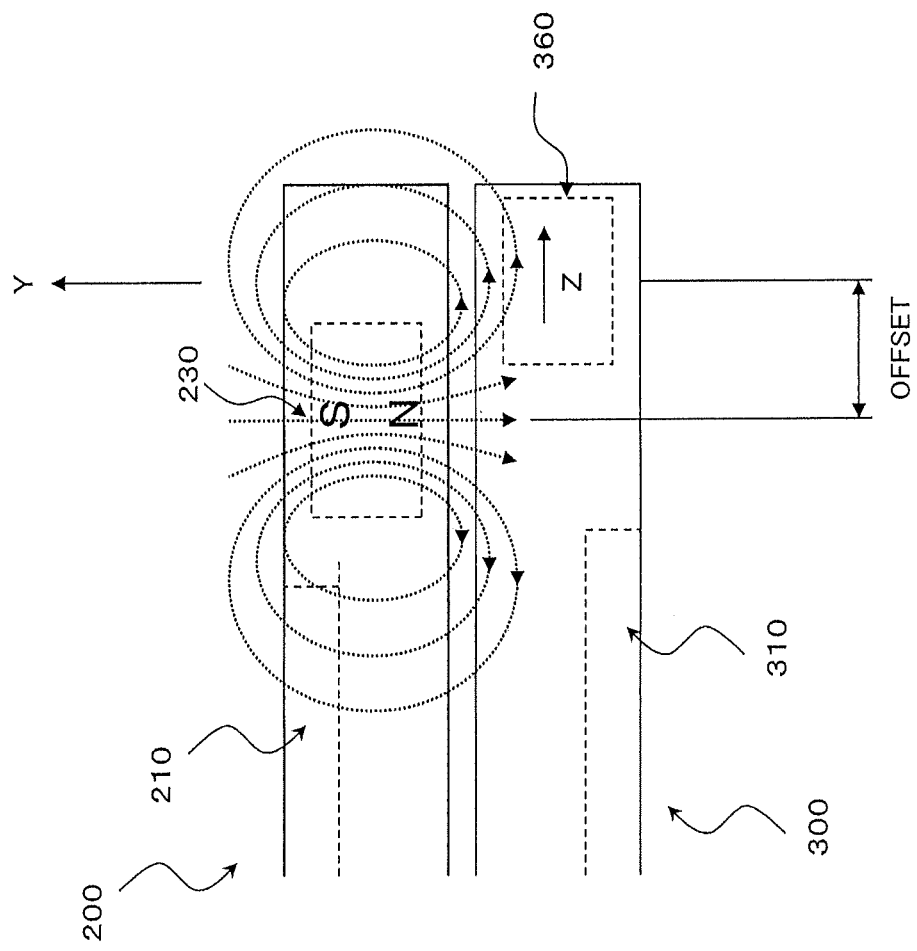
FIG. 6 is a view illustrating the configuration for detecting the change of the state of the computer from the tablet state to the PC state, according to the first embodiment.

FIG. 6 is a view illustrating the configuration for detecting the state of the change of the computer from the tablet state to the PC state, according to the first embodiment.

The computer 100 according to the present embodiment detects the change of the computer 100 from the tablet state to the PC state, by detecting the change of the direction of magnetic fluxes from the magnet 230 by the magnetic sensor 350. In cases where the magnetic sensor 350 is arranged on the line connecting the S and N poles of the magnet 230 to each other, magnetic fluxes are hardly changed when the first housing 300 is rotated about the hinge 400 as indicated by an arrow Y in FIG. 6. Therefore, in the computer 100 according to the present embodiment, the magnet 230 and the magnetic sensor 350 are arranged at positions which enable the magnetic sensor 350 to easily detect the change in the direction of magnetic fluxes from the magnet 230 at the time of transformation from the tablet state to the PC state. More specifically, the magnetic sensor 350 is arranged to have an offset to the magnet 230 in the direction orthogonal to the direction connecting the N and S poles of the magnet 230 to each other. More specifically, the magnet 230 and the magnetic sensor 350 are arranged such that the direction of magnetic fluxes from the magnet 230 at the position of the magnetic sensor 350 is substantially orthogonal to the direction connecting the N and S poles of the magnet 230 to each other, as indicated by an arrow Z. With the above arrangement, it is possible to improve the accuracy of detection of the change from the tablet state to the PC state. With the above arrangement, it is possible to cause the direction of magnetic fluxes from the magnet 230 at the magnetic sensor 350 to be greatly changed, which facilitates the detection of the change in the direction of magnetic fluxes from the magnet 230.

Figure 7:
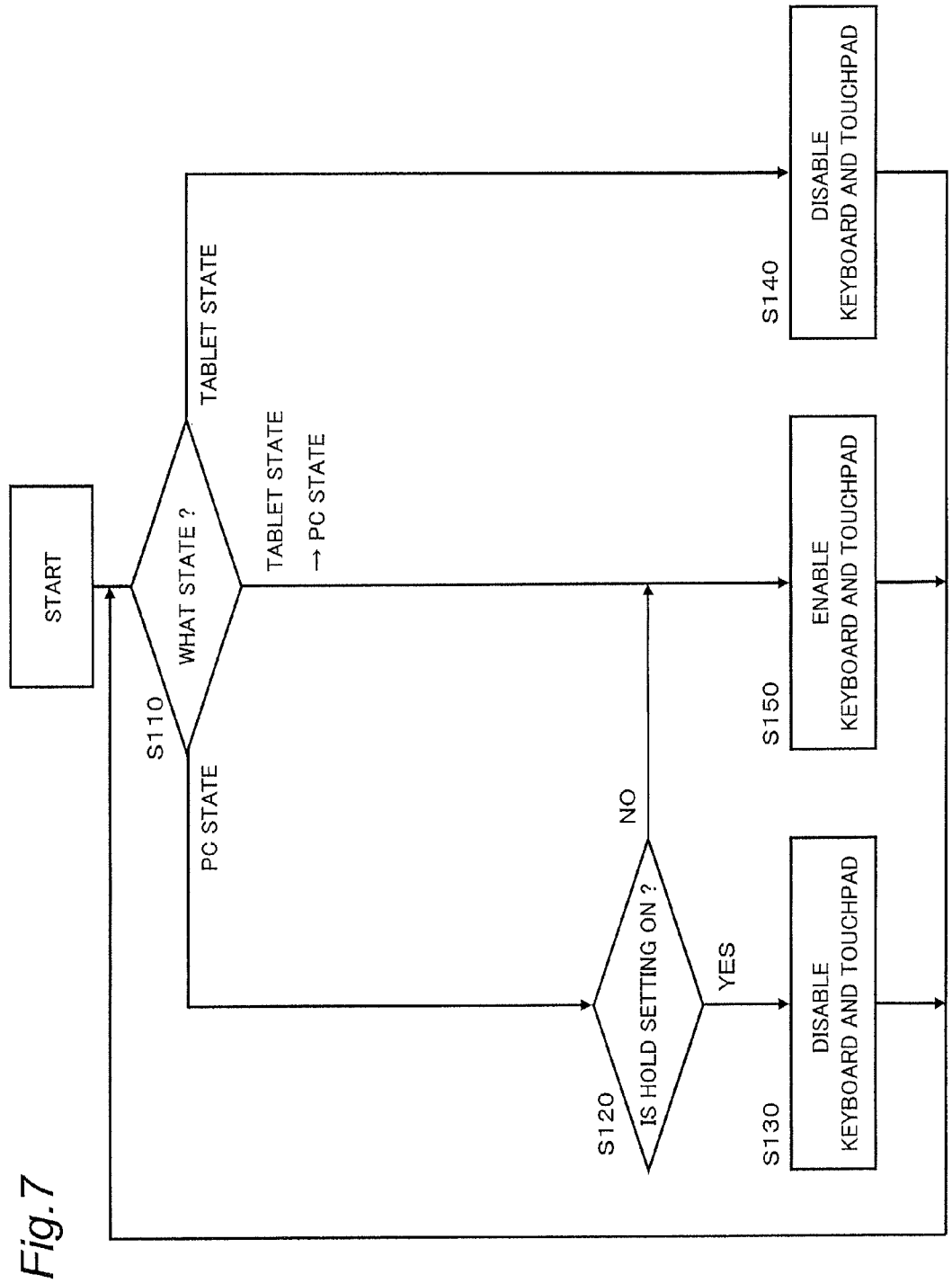
FIG. 7 is a flow chart illustrating an example of control for disabling the keyboard and the like in the computer according to the first embodiment.

FIG. 7 is a flow chart illustrating an example of control for disabling the keyboard and the like in the computer according to the first embodiment.

The CPU 110 determines whether the computer 100 is currently in the PC state or the tablet state, or has just been changed from the tablet state to the PC state (S110).

If it is determined in step S110 that the computer 100 is in the PC state, the CPU 110 determines whether or not the hold setting is ON (S120).

If it is determined in step S120 that the hold setting is ON, the CPU 110 disables inputs to the keyboard 311, the left button 312, the right button 313, and the track pad 314 in the input device 310.

On the contrary, if it is determined in step S120 that the hold setting is not ON, the CPU 110 enables inputs to the keyboard 311, the left button 312, the right button 313, and the track pad 314 in the input device 310.

If it is determined in step S110 that the computer 100 is in the tablet state, the CPU 110 disables inputs to the keyboard 311, the left button 312, the right button 313, and the track pad 314 in the input device 310, regardless of whether or not the hold setting is ON (S140).

If it is determined in step S110 that the computer 100 has just been changed from the tablet state to the PC state, the CPU 110 enables inputs to the keyboard 311, the left button 312, the right button 313, and the track pad 314 in the input device 310, regardless of whether or not the hold setting is ON (S150).

1-4. Effects and the Like

The computer 100 according to the present embodiment includes:

the input device 310, the liquid crystal display 210 (the display) that displays information, the first housing 300 including the input device 310, the second housing 200 including the liquid crystal display 210 (the display), the hinge 400 (the coupler) that couples the first housing 300 and the second housing 200 to each other to enable changing of the positional relationship therebetween, the hold switch 360 (the setter) which allows the user to make a setting for enabling or disabling inputting to the input device, the magnetic sensor 350 (the positional-relationship detector) that detects the positional relationship between the first housing 300 and the second housing 200, and the CPU 110 (the controller) that enables inputting to the input device, regardless of the setting by the hold switch 360, when the result of the detection by the magnetic sensor 350 satisfies a first predetermined condition, in a case where the setting by the hold switch 360 is made to disable inputting to the input device.

Thus, even when a setting by the hold switch 360 is made to disable inputs to the input device, if the positional relationship between the first housing 300 and the second housing 200 satisfies the first predetermined condition, it is possible to enable inputs to the input device, regardless of the content of setting by the hold switch 360. Accordingly, it is possible to enable inputs to the input device without causing the user to manipulate the hold switch 360 again. This can improve the user's usability of the computer 100 (the electronic device) which can be used by being changed between the PC state and the tablet state.

Further, in the computer 100 according to the present embodiment, when the result of the detection by the magnetic sensor 350 satisfies a second predetermined condition, the CPU 110 disables inputs to the input device, regardless of the setting by the hold switch 360.

Thus, even when the user has forgotten to make a setting by the hold switch 360 for disabling inputs to the input device, it is possible to disable inputs to the input device.

Further, in the computer 100 according to the present embodiment, the first housing 300 and the second housing 200 are coupled to each other by the hinge 400 to be rotatable with respect to each other by 360 degrees, the computer 100 is configured to be in the tablet state in which the input device 310 is oriented in the direction opposite to the second housing 200 and the liquid crystal display 210 is oriented in the direction opposite to the first housing 300, while the first housing 300 and the second housing 200 are overlaid on each other, and the magnetic sensor 350 detects at least the tablet state and a state other than the tablet state.

This enables the control appropriate to the tablet state and the other states.

Further, in the computer 100 according to the present embodiment, one of the first housing 300 and the second housing 200 is provided with the magnet 230, and the positional-relationship detector 350 is a magnetic sensor which is provided in the other one of the first housing 300 and the second housing 200, and detects the direction of magnetic fluxes from the magnet 230.

This enables detecting of the positional relationship between the first housing 300 and the second housing 200 with a simple configuration.

Further, in the computer 100 according to the present embodiment, the magnet 230 is arranged such that the direction connecting the N and S poles thereof is substantially parallel with the direction in which the first housing 300 and the second housing 200 move with respect to each other in transition from the tablet state to the other states, and the magnetic sensor 350 is arranged to have an offset to the magnet 230 in the direction orthogonal to the direction connecting the N and S poles of the magnet 230 to each other.

This enables efficient detecting of the change in the direction of magnetic fluxes. In the present embodiment, the magnet 230 is arranged such that the direction connecting the N and S poles thereof is substantially parallel with the direction in which the first housing 300 and the second housing 200 move with respect to each other in transition from the tablet state to other states. In this case, at the N and S poles of the magnet and in the vicinity thereof, the direction of magnetic fluxes is a direction substantially parallel with the N and S poles of the magnet. In this case, if the magnetic sensor 350 is arranged on the line connecting the N and S poles of the magnet or in the vicinity thereof, the magnetic sensor 350 is moved with respect to the magnet 230 in the direction connecting the N and S poles of the magnet to each other, when the first housing 300 and the second housing 200 are rotated with respect to each other. This causes the direction of magnetic fluxes at the position of the magnetic sensor 350 to be hardly changed. Accordingly, it is difficult to detect the change of the positional relationship between the first housing 300 and the second housing 200. To cope therewith, in the present embodiment, the magnetic sensor 350 is arranged to have an offset to the magnet 230 in the direction orthogonal to the direction connecting the N and S poles of the magnet 230 to each other. This makes it easier to change the direction of magnetic fluxes at the magnetic sensor 350, when the first housing 300 and the second housing 200 are moved with respect to each other. This facilitates detection of the change from the tablet state to the other states.

Further, in the computer 100 according to the present embodiment, the setter 360 is the hold switch (the manipulation switch).

Accordingly, the setter 360 can be configured simply.

Further, in the computer 100 according to the present embodiment, the hold switch 360 is arranged in the surface in which the input device 310 is arranged.

Accordingly, the hold switch 360 can be easily manipulated.

Further, in the computer 100 according to the present embodiment, the hold switch 360 is arranged between the left button 312 and the right button 313 (the left and right function selection switches).

This can improve the manipulability of the hold switch 360.

Other Embodiments

As described above, the first embodiment is described as an example of the technique disclosed in the present application. However, the technique according to the present disclosure is not limited thereto and can be also applied to embodiments which are provided by appropriately making changes, replacements, additions, and omissions thereto.

In the present embodiment, if it is determined in step S120 that the hold setting is ON, the CPU 110 determines to disable inputs to the keyboard 311, the left button 312, the right button 313, and the track pad 314 in the input device 310. However, the present disclosure is not limited thereto. The inputs to be disabled when the hold setting is ON are some of inputs to the keyboard 311, the left button 312, the right button 313, and the track pad 314. That is, "disabling inputs to the input device" includes disabling a part of the input device included in the computer 100. For example, only inputs to the track pad 314 can be disabled, when the hold setting is ON. In this manner, it is possible to prevent erroneous inputs induced by wrongly touching the track pad when performing inputting to the keyboard 311 in the PC state. Further, in this case, the user can perform manipulations equivalent to manipulations which can be performed through the track pad, using a mouse and the like which are connected thereto separately. As described above, the hold switch 360 not only has the function of preventing erroneous inputs to the input device when the shape of the computer 100 is transformed to the PC state and the tablet state, but also has the function of preventing erroneous inputs in the PC state. Also, it is possible to allow the user to make settings as to which inputs should be disabled, out of inputs to the keyboard 311, the left button 312, the right button 313, and the track pad 314. More specifically, it is possible to expand, in the memory 320, software for making settings as to which inputs should be disabled through the hold setting, in order to allow the user to make such settings. Also, it is possible to allow the user to make settings for disabling none of inputs, even when the hold setting is ON. That is, it is possible to enable a changeover between enabling and disabling the hold setting itself, through software control. Further, if it is determined in step S110 that the computer 100 is in the tablet state, the CPU 110 disables inputs to the input device 310, regardless of whether or not the hold setting is ON. This disabling operation includes an operation for disabling only a part of the input device.

In the present embodiment, if it is determined in step S110 that the computer has just been changed from the tablet state to the PC state, the CPU 110 enables inputs to the keyboard 311, the left button 312, the right button 313, and the track pad 314 in the input device 310, regardless of whether or not the hold setting is ON. However, the present disclosure is not limited thereto. When the computer 100 has been changed from the tablet state to the PC state, it is possible to automatically perform a changeover to enable inputs to the input device which have been disabled, and it is also possible to perform a changeover to enable inputs to the input device after making predetermined determinations. In this case, the predetermined determinations include determinations which are made based on commands which the computer 100 has explicitly received from the user. Also, the computer 100 can be configured such that it can changeover between a mode for enabling inputs to the input device regardless of whether or not the hold setting is ON and a mode for enabling inputs to a part of the input device other than the part of the input device which is disabled through the hold setting when the hold setting is ON.

In the present embodiment, the positional-relationship detector is constituted by the magnetic sensor 350. However, the present disclosure is not limited thereto. For example, it is also possible to employ a sensor for detecting the rotational angle between the first housing 300 and the second housing 200. This enables accurate detection of the change of the positional relationship therebetween.

In the present embodiment, there is described a case where the electronic device is the computer 100. However, the present disclosure is not limited thereto. The present disclosure can be widely applied to an electronic device including an input device, a display for displaying information, a first housing provided with the input device, a second housing provided with the display, and a coupler for coupling the first housing and the second housing to each other such that the positional relationship therebetween can be changed. For example, the present disclosure can be also applied to electronic notebooks and electronic gaming machines.

In the present embodiment, the hold switch 360 is arranged between the left button 312 and the right button 313 (the left and right function selection switches). However, the present disclosure is not limited thereto. The hold switch 360 can be arranged at an arbitrary position in the first housing 300 and the second housing 200, as long as the hold switch 360 does not interfere with other parts and the like.

As described above, the embodiments have been described as examples of the technique according to the present disclosure. For this purpose, the accompanying drawings and the detailed description have been given.

Accordingly, the constituents described in the accompanying drawings and the detailed description may also include constituents which are unnecessary for overcoming the problems, in order to exemplify the aforementioned techniques, as well as constituents necessary for overcoming the problems. Therefore, such unnecessary constituents should not be immediately determined to be necessary, for the reason that these unnecessary constituents are described in the accompanying drawings and the detailed description.

Further, the aforementioned embodiment merely exemplifies the technique according to the present disclosure, and therefore, various changes, replacements, additions, omissions, and the like can be made thereto within the scope of the claims and scopes equivalent thereto.

INDUSTRIAL APPLICABILITY

The present disclosure can be applied to an electronic device including an input device, a display for displaying information, a first housing provided with the input device, a second housing provided with the display, and a coupler for coupling the first housing and the second housing to each other such that the positional relationship therebetween can be changed, wherein such an electronic device have improved usability for users. More specifically, the present disclosure can be applied to computers, electronic notebooks, electronic gaming machines, and the like.

What is claimed is:

1. An electronic device comprising:
an input device;
a display that displays information;
a first housing provided with the input device;
a second housing provided with the display;
a coupler that couples the first housing and the second housing to each other to enable changing of a positional relationship between the first housing and the second housing;
a setter that allows a user to make a setting for enabling or disabling inputting to the input device;
a positional-relationship detector that detects the positional relationship between the first housing and the second housing; and
a controller that enables inputting to the input device, regardless of a setting by the setter, when a result of detection by the positional-relationship detector satisfies a first predetermined condition, in a case where a setting by the setter is made to disable inputting to the input device.

2. The electronic device according to claim 1, wherein when the result of detection by the positional-relationship detector satisfies a second predetermined condition, the controller disables inputting to the input device, regardless of the setting by the setter.

3. The electronic device according to claim 1, wherein the first housing and the second housing are coupled to each other by the coupler to be rotatable with respect to each other by 360 degrees,
the electronic device is configured to be in a tablet state in which the input device is oriented in a direction opposite to the second housing, and the display is oriented in a direction opposite to the first housing, while the first housing and the second housing are overlaid on each other, and
the positional-relationship detector detects at least the tablet state and a state other than the tablet state.

4. The electronic device according to claim 3, wherein one of the first housing and the second housing is provided with a magnet, and
the positional-relationship detector is a magnetic sensor which is provided in the other one of the first housing and the second housing, and detects a direction of a magnetic flux from the magnet.

5. The electronic device according to claim 4, wherein the magnet is arranged such that a direction connecting N and S poles thereof is substantially parallel with a direction in which the first housing and the second housing move with respect to each other in transition from the tablet state to the other states, and
the magnetic sensor is arranged to have an offset to the magnet in a direction orthogonal to the direction connecting the N and S poles of the magnet to each other.

6. The electronic device according to claim 1, wherein the setter is a manipulation switch.

7. The electronic device according to claim 6, wherein the manipulation switch is arranged in a surface in which the input device is arranged.

8. The electronic device according to claim 6, wherein
the input device includes left and right function selection switches, and
the manipulation switch is arranged between the left and right function selection switches.

* * * * *